United States Patent
Galant (10) Patent No.: US 8,244,013 B2
(45) Date of Patent: Aug. 14, 2012

(54) MEDICAL IMAGE DATA PROCESSING AND INTERVENTIONAL INSTRUMENT IDENTIFICATION SYSTEM

(75) Inventor: Adam K. Galant, Carpentersville, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 604 days.

(21) Appl. No.: 12/552,883

(22) Filed: Sep. 2, 2009

(65) Prior Publication Data

US 2010/0061608 A1 Mar. 11, 2010

Related U.S. Application Data

(60) Provisional application No. 61/095,775, filed on Sep. 10, 2008.

(51) Int. Cl.
*G06K 9/00* (2006.01)
(52) U.S. Cl. ........ 382/128; 382/130; 382/131; 382/132; 378/4; 378/8
(58) Field of Classification Search .......... 382/128–132; 378/4, 8
See application file for complete search history.

(56) References Cited

U.S. PATENT DOCUMENTS

| 5,592,939 | A | 1/1997 | Martinelli |
| 6,675,040 | B1 | 1/2004 | Cosman |
| 2004/0138556 | A1 | 7/2004 | Cosman |
| 2007/0147682 | A1 | 6/2007 | Chang |
| 2008/0051648 | A1 | 2/2008 | Suri |
| 2008/0095417 | A1* | 4/2008 | Pedrizzetti et al. ........... 382/128 |
| 2008/0298656 | A1* | 12/2008 | Yim et al. ..................... 382/128 |
| 2009/0185730 | A1 | 7/2009 | Baumgart |
| 2009/0226063 | A1* | 9/2009 | Rangwala et al. ............ 382/128 |

* cited by examiner

*Primary Examiner* — Sind Phongsvirajati
(74) *Attorney, Agent, or Firm* — Alexander J Burke (57) ABSTRACT

A system processes pixel representative image data of medical images of patient anatomy to automatically identify an interventional instrument. The system includes an acquisition processor that receives pixel luminance data comprising multiple sequential medical images of a patient anatomical portion and luminance data of an individual image comprises multiple pixel luminance representative values of multiple individual pixels of the individual image. An image data processor detects and subtracts background image data from the pixel luminance data comprising the multiple sequential medical images to provide processed pixel luminance data comprising multiple processed sequential medical images. The image data processor computes gradient components of individual pixels of the processed pixel luminance data. The image data processor modifies the computed gradient component data by suppressing computed gradient components lacking symmetry about an interventional instrument width dimension and filters the modified computed gradient component data for use in providing image representative data showing the interventional instrument.

13 Claims, 9 Drawing Sheets

```
//----------------------------------------------------
// Symmetry discrimination
//----------------------------------------------------
void  SymBoost( in float2 t : TEXCOORD0,
         out float4 out_0:COLOR0,
         out float4 out_1:COLOR1)
{
  float th1  = 0.1;   // min. required gradient amplitude
  float th2  = 0.3;

float2 diff = float2 (0.0, 0.0);
  float sum ; // = float2 (0.0, 0.0);

float2 outPix = float2 (0.0, 0.0);

float  width = 5.0/256.0;
  float2 Grad_c = tex2D( tex0, t);     // get the gradient at pix
  if (length(Grad_c) > th1)            // test if not to small
  {
    float2 gcn    = normalize(Grad_c);            // normalize to get direction vector gcn
    float2 Grad_d = tex2D(tex0, t + width*gcn);   // read the counterpart gradient
                                                  // in the gcn direction at the distance = width if (length(Grad_d) > th1)         // test if it has sufficient amplitude
     {
      diff = Grad_c - Grad_d;    // c and d are pointing in opposite directions diff should be large
      sum  = length(Grad_c + Grad_d); // and sum should be small (ideally they should cancel)
       if (sum < th2 )          // see if they cancel sufficiently well
       {
        outPix =  diff*(1.0 - sum/th2);  // amplify the gradient with large diff and small sum
       }
     }
  }
  out_0 = length(outPix) + 0.1;    // use this to visualize  magnitude
  //out_0 = float4 (outPix.y, outPix.y, 0.0, 0.0)+0.5;
  out_1 = float4 (outPix.x, outPix.y, 0.0, 0.0);  // components of the "modified gradient"
}
```

```
//---------------------------------------------------------------
// Cath Detection & overlay
//---------------------------------------------------------------
float4 CathDet ( in float2 t : TEXCOORD0 ) : COLOR0
{
    float p  = float(1.0f/512.0);  // output image pixel spacing (512x512)
    float p5 = 5.0f*p;              // 1/2 width of the catheter to be detected in x or y-direction
    float p3 = 3.54f*p;             //approx x- and y- components of 1/2 width of the catheter at 45
deg direction //" asymetric wide Sobel"
    float sum = 0.0f;  // .r and .g below are x and y gradient components
                      // stored in the red and green channels of the input image
    sum += tex2D(tex0,t+float2(-p5,0.0)).r - tex2D(tex0,t+float2(+p5,0.0)).r;
    sum += tex2D(tex0,t+float2(-p3,-p3)).r - tex2D(tex0,t+float2(+p3,+p3)).r;
    sum += tex2D(tex0,t+float2(-p3,-p3)).g - tex2D(tex0,t+float2(+p3,+p3)).g;
    sum += tex2D(tex0,t+float2(-p3,+p3)).r - tex2D(tex0,t+float2(+p3,-p3)).r;
    sum += tex2D(tex0,t+float2(+p3,-p3)).g - tex2D(tex0,t+float2(-p3,+p3)).g;
    sum += tex2D(tex0,t+float2(0.0,-p5)).g - tex2D(tex0,t+float2(0.0,+p5)).g;

float cc = sum -0.5;                    // 0.5 is the first detection threshold
    clip(cc);  // this suppresses output if cc < 0.0
              // so that original image is shown instead
    float gg = 0.0;
    if (sum > 2.0) gg = 1.0;  // add some green for a higher amplitude of sum
    return  float4(cc, gg, 0.0, 0.0);
}
```

MEDICAL IMAGE DATA PROCESSING AND INTERVENTIONAL INSTRUMENT IDENTIFICATION SYSTEM

This is a non-provisional application of provisional application Ser. No. 61/095,775 filed Sep. 10, 2008, by A. K. Galant.

FIELD OF THE INVENTION

This invention concerns a system for processing pixel representative image data of medical images of patient anatomy to automatically identify an interventional instrument.

BACKGROUND OF THE INVENTION

In known systems, when a radiological medical image is electronically processed or analyzed, the static background can overwhelm and obscure information of interest including location of an interventional device. Removing static background substantially enhances the visibility and therefore the automatic detection of moving or changing anatomical features by eliminating the clutter of inconsequential detail. Removing static background detail also improves image visualization by eliminating the clutter. A known method for background removal involves Digital Subtracted Angiography (DSA). DSA is mainly used for visualization of blood vessels filled with a contrast agent (e.g., an X-ray opaque dye). DSA involves acquiring a reference image (called a mask) which contains only background detail. In angiography a mask comprises an image acquired before injection of a contrast agent into patient anatomy. In known systems, in order to remove static background detail from images, a mask image is subtracted from subsequent images acquired when a contrast agent is in the blood which yields a clear picture of blood vessels filled with the contrast agent.

DSA cannot be performed if a background mask image is unobtainable such as if it is required to enhance an image of a catheter placed in a patient heart. Even if the catheter could be removed to acquire a background image, patient movement (including respiratory and heart beat movement) impairs a mask image. A system according to invention principles addresses these deficiencies and related problems.

SUMMARY OF THE INVENTION

A system provides real-time detection of catheters and other interventional devices in medical image sequences acquired using a biplane C-arm X-ray system, for example, used for computing a 3D (three dimensional) location of an interventional device in a patient body. A system processes pixel representative image data of medical images of patient anatomy to automatically identify an interventional instrument. The system includes an acquisition processor that receives pixel luminance data comprising multiple sequential medical images of a patient anatomical portion and luminance data of an individual image comprises multiple pixel luminance representative values of multiple individual pixels of the individual image. An image data processor detects and subtracts background image data from the pixel luminance data comprising the multiple sequential medical images to provide processed pixel luminance data comprising multiple processed sequential medical images. The image data processor computes gradient components of individual pixels of the processed pixel luminance data. The image data processor modifies the computed gradient component data by suppressing computed gradient components lacking symmetry about an interventional instrument width dimension and filters the modified computed gradient component data for use in providing image representative data showing the interventional instrument.

DETAILED DESCRIPTION OF THE INVENTION

A system provides real-time detection of catheters and other interventional instruments in a sequence of medical radiological images acquired using a biplane C-arm X-ray system, for example, for the purpose of computing a 3D position of an interventional instrument in patient anatomy. The system comprises a process including temporal and spatial image processing activities.

Figure 1:
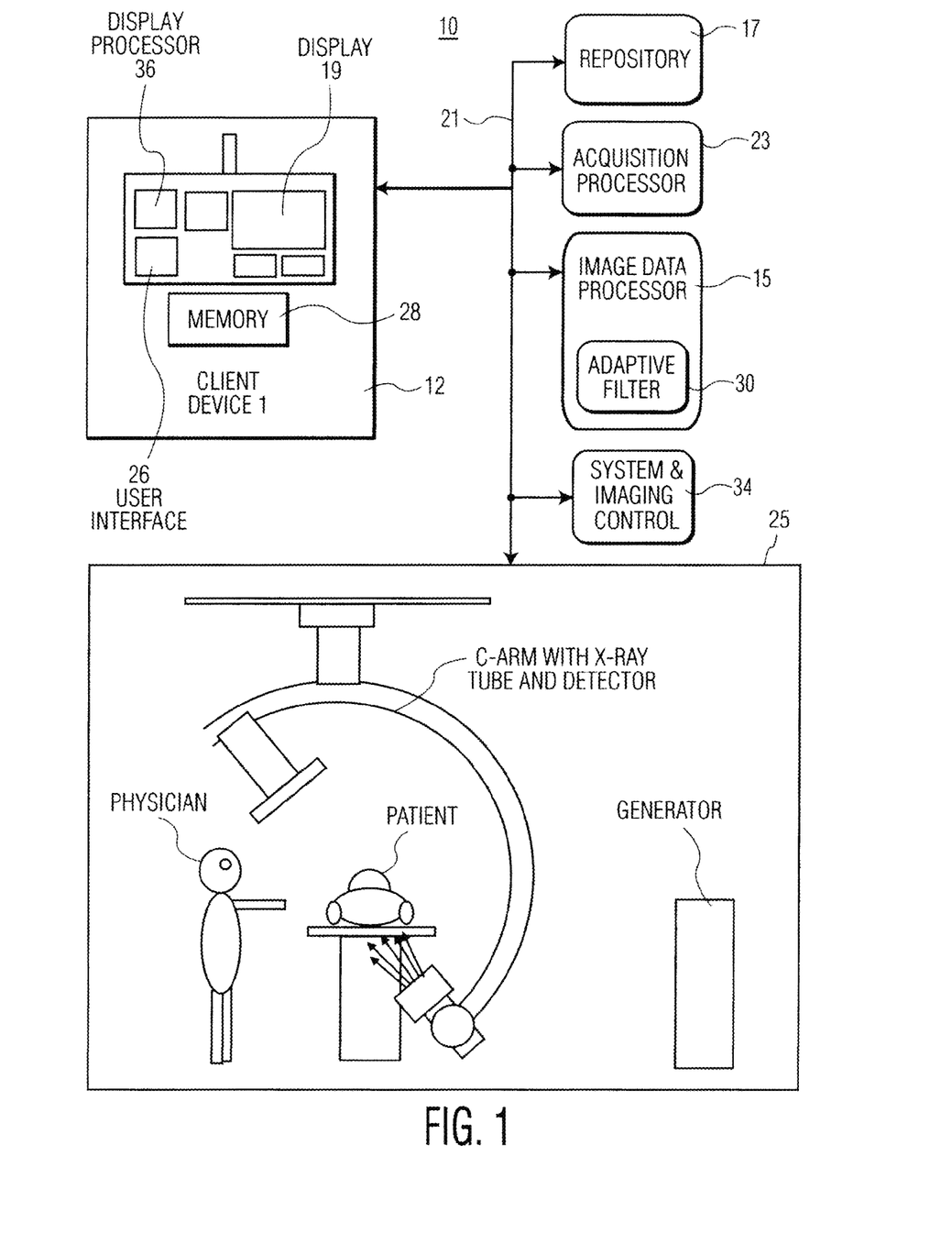
FIG. 1 shows a medical image data processing system for identifying an interventional instrument, according to invention principles.

FIG. 1 shows a medical image data processing system 10 for identifying an interventional instrument. System 10 includes one or more processing devices (e.g., workstations, computers or portable devices such as notebooks, Personal Digital Assistants, phones) 12 that individually include memory 28, display processor 36, user interface 26 enabling user interaction with a Graphical User Interface (GUI) and display 19 supporting GUI and image presentation in response to predetermined user (e.g., physician) specific preferences. As well as device 12, system 10 also includes at least one repository 17, and imaging device 25, image data processor 15, acquisition processor 23, adaptive filter 30 and system and imaging controller 34 intercommunicating via network 21. At least one repository 17 stores medical image studies for patients in DICOM compatible (or other) data format. A medical image study individually includes multiple image series of a patient anatomical portion which in turn individually include multiple images.

Acquisition processor 23 receives pixel luminance data comprising multiple sequential medical images of a patient anatomical portion. Luminance data of an individual image comprises multiple pixel luminance representative values of a multiple individual pixels of the individual image. Image data processor 15 detects and subtracts background image data from the pixel luminance data to provide processed pixel luminance data comprising multiple processed sequential medical images. Image data processor 15 computes gradient components of individual pixels of the processed pixel luminance data and modifies the computed gradient component data by suppressing computed gradient components lacking symmetry about an interventional instrument width dimension. Adaptive filter 30 in processor 15, filters the modified computed gradient component data for use in providing image representative data showing the interventional instrument. X-ray imaging device 25 acquires multiple sequential images of vessel structure of a portion of patient anatomy in the presence of a contrast agent. Image data processor 15 aligns individual images of the multiple sequential images with a single particular mask image containing background detail of the portion of patient anatomy in the absence of contrast agent and forms data representing multiple digitally subtracted images by subtracting data representing the single particular mask image from aligned individual images of the multiple sequential images. Display processor 36 generates data representing display images (including the composite image) for presentation by a reproduction device (e.g., display 19 or a printer) to a user. Imaging controller 34 controls operation of imaging device 25 in response to user commands entered via user interface 26.

Figure 10:
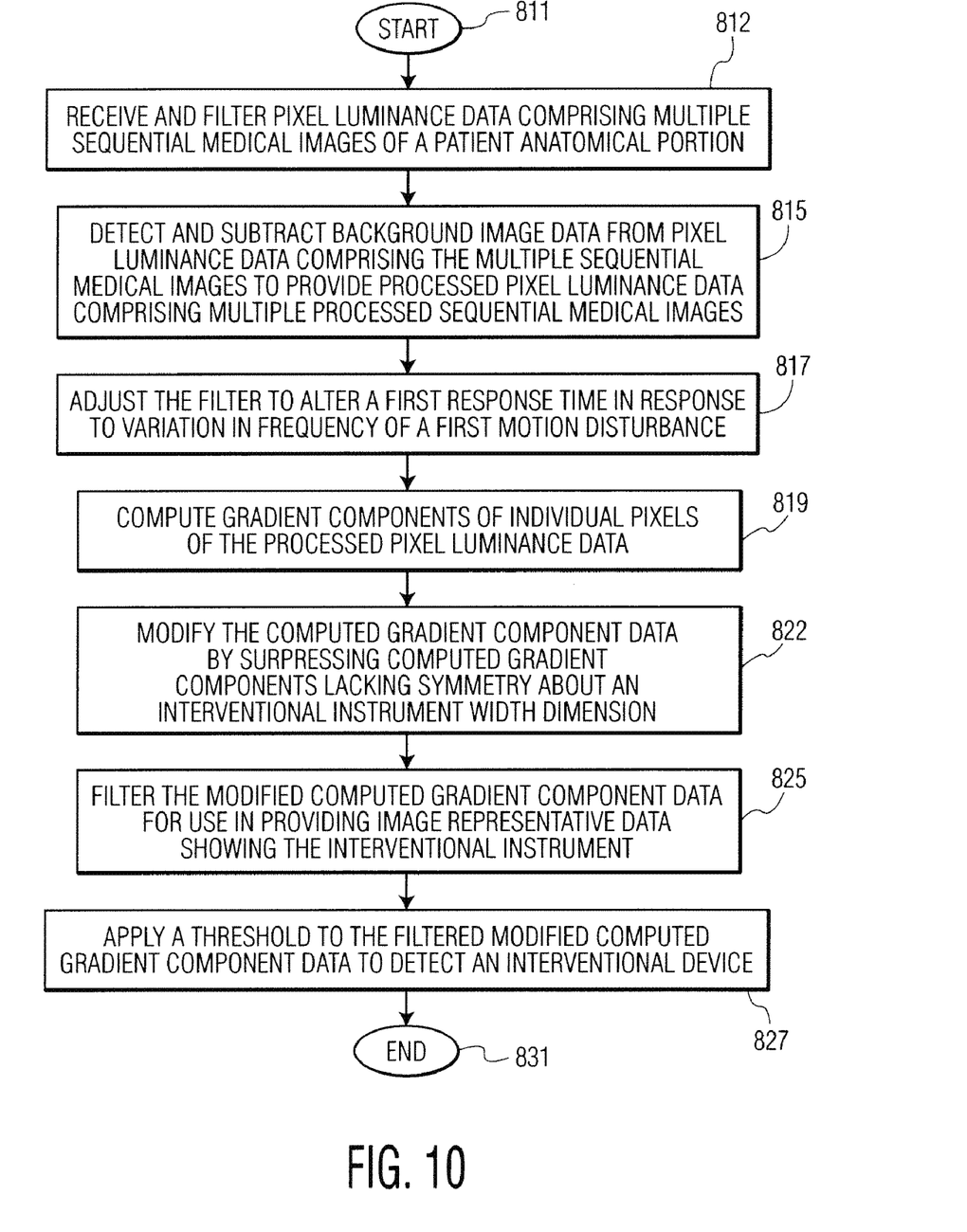
FIG. 10 shows a flowchart of a process used by a medical image data processing system for identifying an interventional instrument, according to invention principles.

FIG. 10 shows a flowchart of a process used by medical image data processing system 10 for identifying an interventional instrument. In step 812 following the start at step 811, acquisition processor 23 receives pixel luminance data comprising multiple sequential medical images of a patient anatomical portion. In step 815 image data processor 15 detects and subtracts background image data from the pixel luminance data comprising the multiple sequential medical images to provide processed pixel luminance data comprising multiple processed sequential medical images. Image data processor 15 detects static background image data by automatically using filter 30 in temporally filtering the received pixel luminance data comprising an incoming sequential medical image datastream. In one embodiment individual pixels are processed separately in the time-domain with a non-linear low-pass filter within adaptive filter 30.

Filter 30 employs relatively fast fall-time (of the order of 2-3 digital processing time interval increments) and relatively slow rise-time (several seconds) for filtering data representing individual pixels of images in which higher X-ray attenuation results in brighter image pixels (images with white bones). For an individual pixel, filter 30 settles at a minimum corresponding attenuation value (luminance intensity value) which for a radiological image is a reasonable estimation of a static background luminance intensity for the individual pixel. Image data processor 15 applies filter 30 in filtering luminance representative values of individual pixels of the multiple sequential medical images to identify substantially minimum luminance values of individual pixels in the multiple sequential medical images as background image data of the multiple sequential medical images. Filter 30 includes a first filter function having a first response time for filtering received luminance representative values of a particular individual pixel varying in response to a first motion disturbance in the multiple sequential medical images for use in identifying a substantially minimum luminance value of the particular individual pixel in the multiple sequential medical images. The first motion disturbance is at least one of, (a) a heart rate related disturbance and (b) a respiratory rate related disturbance. Adaptively variable filter 30 is adjusted by processor 15 in step 817 (FIG. 10) to alter the first response time in response to variation in frequency of the first motion disturbance.

Image data processor 15 subtracts detected background image data from the pixel luminance data to provide an image representative motion data layer to provide processed pixel luminance data comprising multiple processed sequential medical images. In one embodiment, processor 15 performs simple arithmetic subtraction of image data pixel by pixel and adds a small constant bias to a resultant pixel data value to provide the processed pixel luminance data and avoid underflow of some pixels in the presence of noise. The background subtraction harmonizes the image intensity and eliminates a need for separate high-pass filtering. Processor 15 employs adaptive filter 30 to low pass filter the processed pixel luminance data to further suppress the noise and other small features of the image. Filter 30 parameters are adaptively selected to minimally suppress objects the size of a catheter width. In one illustrative embodiment filter 30 iteratively performs one to four consecutive passes of a separable (horizontal, vertical) convolution filter with Gaussian kernel (1, 6, 15, 20, 15, 6, 1)/64, for example.

Figure 2:
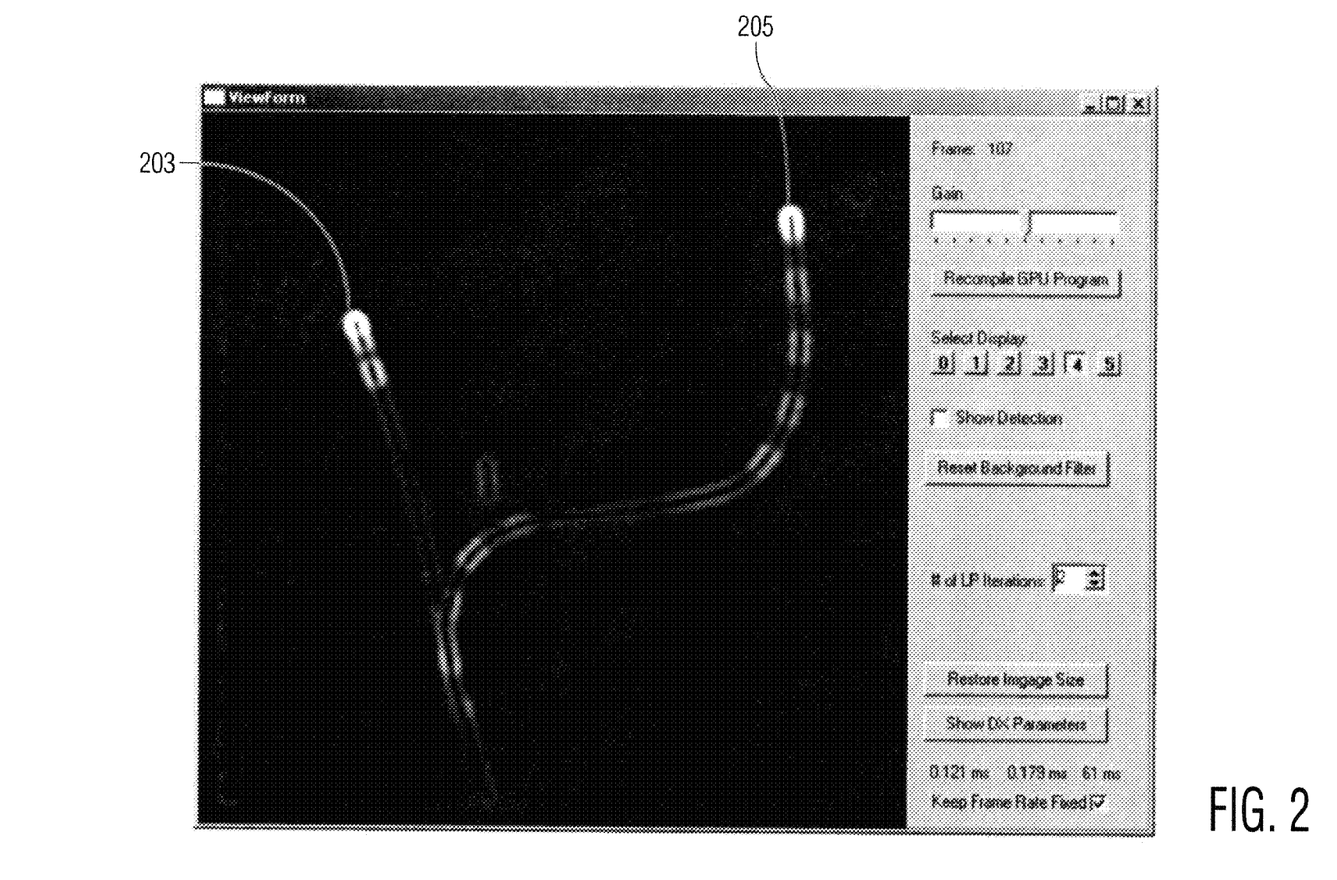
FIG. 2 shows a catheter image illustrating a computed gradient magnitude image component, according to invention principles.

In step 819 (FIG. 10), image data processor 15 computes gradient components of individual pixels of the processed pixel luminance data by computing a pixel intensity gradient vector field. FIG. 2 shows a catheter image illustrating a computed gradient magnitude image component determined for user viewing by image data processor 15 performing static background image data subtraction from the pixel luminance data and low-pass filtering the resultant pixel luminance data by iteratively performing two filtering passes using a Low Pass Gaussian filter. Maximum luminance gradients are indicated at the ends of the catheter 203 and 205 signifying these are points of maximum rate of luminance change due to catheter movement.

Figure 3:
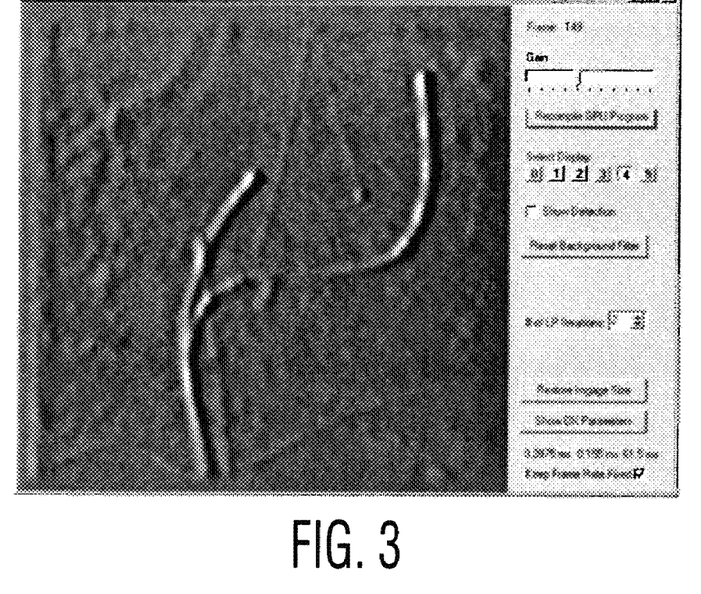
FIGS. 3 and 4 show images presenting x and y image components respectively, of the catheter image of FIG. 2, according to invention principles.
Figure 4:
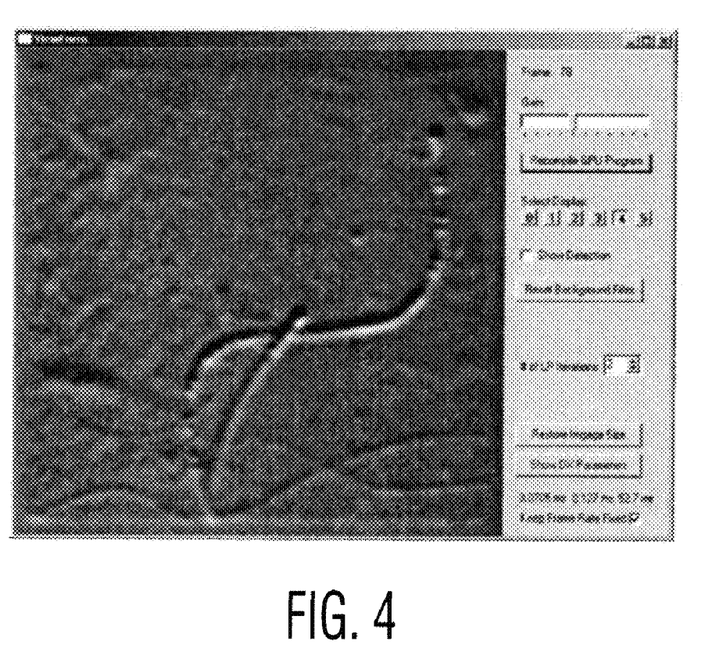

FIGS. 3 and 4 shows images presenting x and y image gradient components respectively, of the catheter image of FIG. 2 determined by image data processor 15. The gradient texture origin is at the lower left corner. The x and y image gradient components are computed for individual pixel luminance intensity values and stored as part of processor 15 texture attribute data of an individual pixel for further processing. Image data processor 15 computes the x and y image gradient components by convolution of image pixel data with the following kernel, $$\begin{pmatrix} -1 & 0 & 1 \\ -2 & 0 & 2 \\ -1 & 0 & 1 \end{pmatrix}$$

for the x-component, and $$\begin{pmatrix} -1 & -2 & -1 \\ 0 & 0 & 0 \\ 1 & 2 & 1 \end{pmatrix}$$

for the y-component, for example.

In step 822 (FIG. 10), image data processor 15 modifies the computed gradient component data by suppressing computed gradient components lacking substantial symmetry about an interventional instrument width dimension to provide modified luminance intensity gradient data. Image data processor 15 compares gradient components of individual pixels with a threshold and modifies the computed gradient component data by suppressing computed gradient components having a magnitude below the threshold. Processor 15 suppresses gradient components which, (a) have a lower magnitude than a given threshold and (b) do not meet predetermined symmetry criteria. The predetermined symmetry criteria require that for a luminance intensity gradient vector of sufficient magnitude, a corresponding luminance intensity gradient counterpart is found in the direction of the gradient at a distance substantially equal to the catheter width. The counterpart luminance intensity gradient vector points, with sufficient tolerance to account for noise, in the opposite direction and with similar amplitude.

Figure 5:
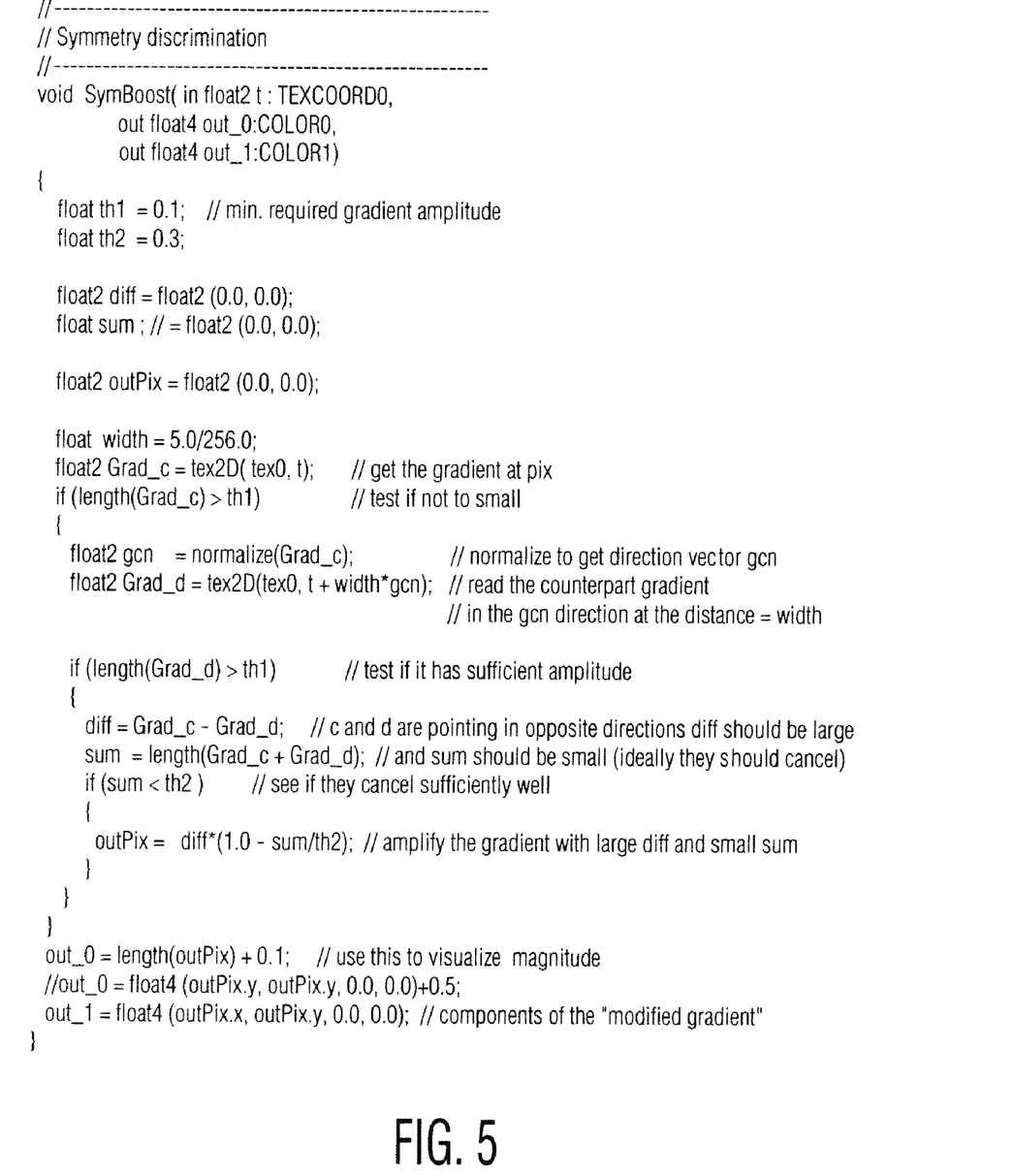
FIG. 5 shows HLSL source code used for device symmetry discrimination used in automatic interventional device detection in a medical image, according to invention principles.
Figure 6:
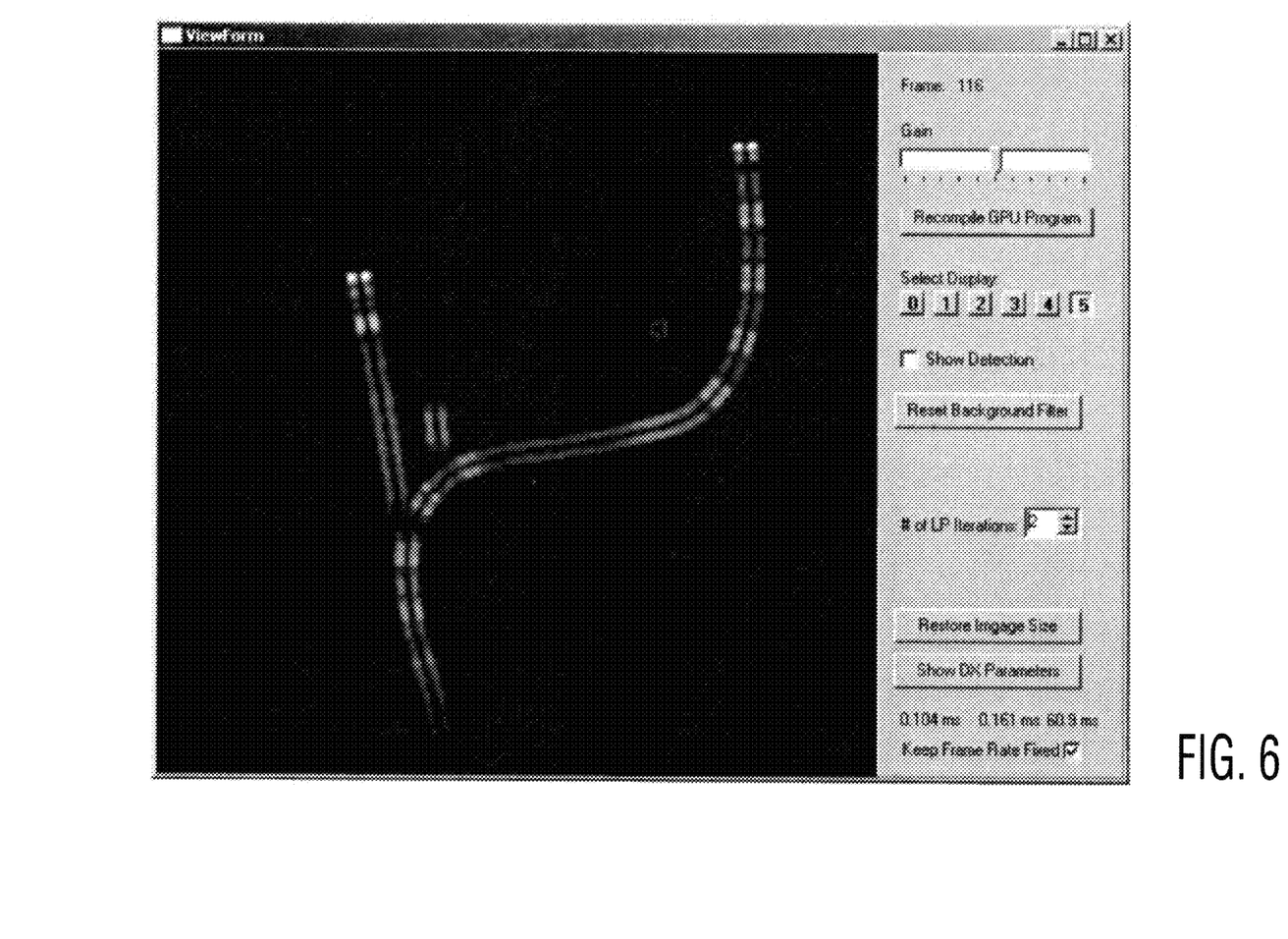
FIG. 6 shows a catheter image illustrating a modified computed gradient magnitude image component, according to invention principles.

FIG. 5 shows High Level Shading Language (HLSL) source code employed by image data processor 15 used for processing computed gradient data for device symmetry discrimination to provide modified computed gradient component data. The modified computed gradient component data is used in automatic interventional device detection in a medical image. High Level Shading Language (HLSL), is a programming language for a Graphic Processing Unit (GPU) which supports function construction with C-like syntax, types, expressions, statements, and functions. The source code of FIG. 5 identifies a luminance intensity gradient corresponding to a counterpart gradient vector of sufficient magnitude in the direction of the gradient and at a distance substantially equal to the catheter width, in response to predetermined symmetry criteria. The source code performs symmetry discrimination and computes x and y components of the modified luminance intensity gradient data and its magnitude (used for presentation in a display image for viewing). FIG. 6 shows a catheter image illustrating a modified computed gradient magnitude image component produced using the code of FIG. 5.

In step 825 (FIG. 10), adaptive filter 30 filters the modified computed gradient component data for detecting the interventional instrument (e.g., a catheter) and for providing image representative data showing the interventional instrument. The interventional instrument detection function is used in conjunction with image pattern matching, for confirmation. The interventional instrument detection is performed in one embodiment, by applying an asymmetric wide Sobel filter function in filter 30, for example, to the components of the modified computed gradient component data.

Figure 7:
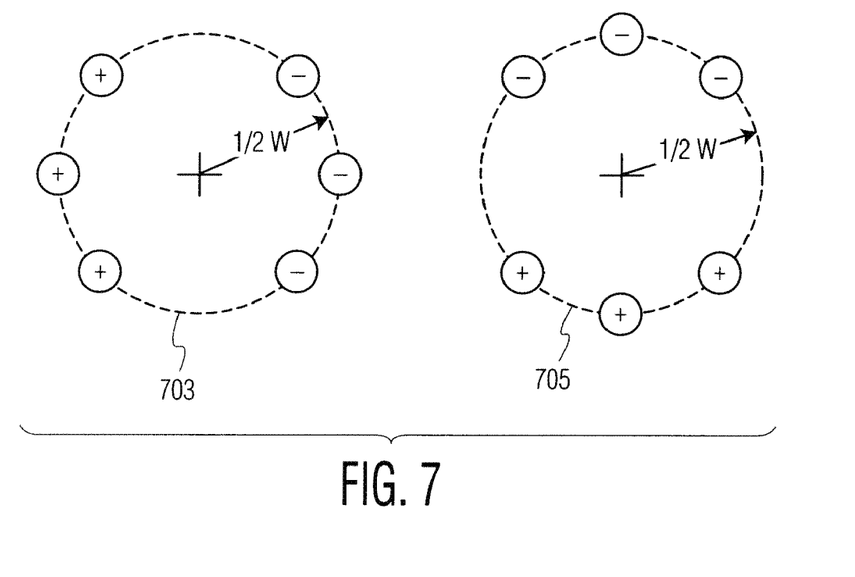
FIG. 7 shows an x and y asymmetric filter kernel configuration used for x and y image component filtering respectively, according to invention principles.

FIG. 7 shows x and y asymmetric filter kernel configurations 703 and 705 used for filtering x and y image components of the modified computed gradient component data, respectively. The filter is asymmetric because it takes advantage of the fact that general directions of the gradient components are known (as, in this case, the object that is brighter is detected). It is wide because, in contrast to a conventional Sobel filter, the opposite sampling points are spaced by the width (W) of the interventional instrument that is to be detected.

Figure 8:
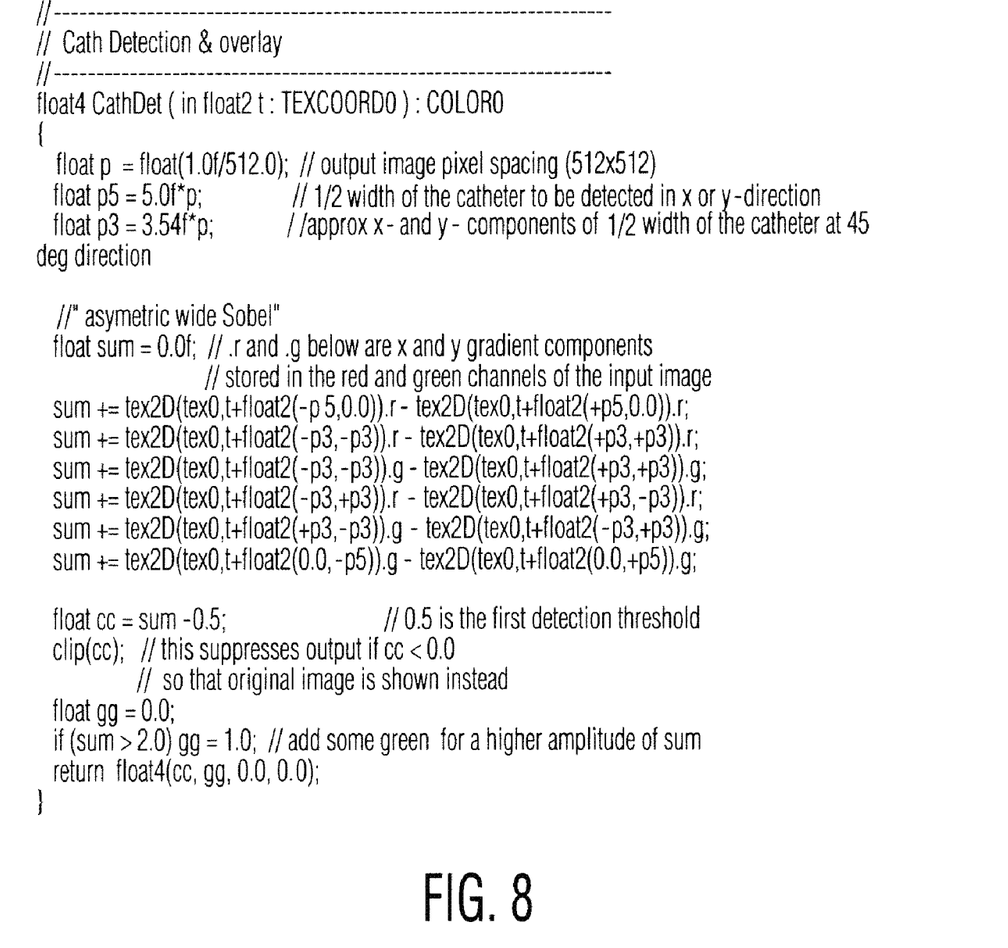
FIG. 8 shows HLSL source code used for interventional device detection, according to invention principles.
Figure 9:
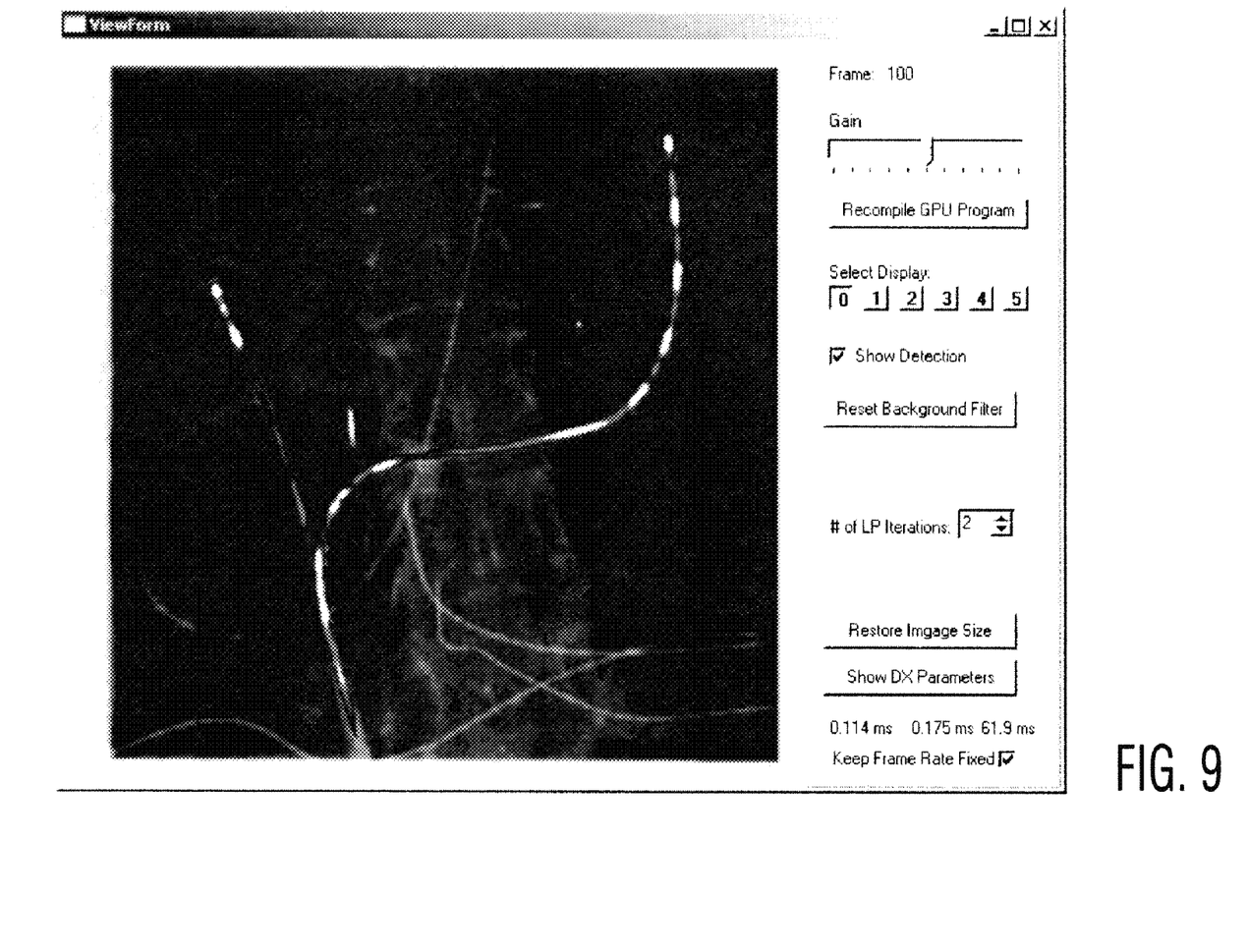
FIG. 9 is a medical image showing an automatically detected interventional device, according to invention principles.

FIG. 8 shows HLSL code used for interventional device detection. The code applies a Sobel filter similar to the filter of FIG. 7 to filter x and y image components of the modified computed gradient component data and in step 827 applies a threshold to the filtered x and y image components of the modified computed gradient. Specifically, image data processor 15 compares the filtered modified computed gradient component data with one or more thresholds and uses filtered modified computed gradient component data exceeding a threshold in providing image representative data showing the interventional instrument. Specifically, processor 15 identifies image data representing an interventional device as data exceeding a threshold. The data exceeds the threshold if the data is at least one of, (a) greater than the threshold and (b) below the threshold. Image data processor 15 adaptively adjusts the threshold to optimize interventional device detection in response to image pattern confirmation analysis. Filtered x and y image component data exceeding the threshold comprise the detected interventional instrument. FIG. 9 is a medical image showing an interventional instrument automatically detected using the code of FIG. 8. The process of FIG. 10 terminates at step 831.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A display processor or generator is a known element comprising electronic circuitry or software or a combination of both for generating display images or portions thereof.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-10 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system provides real-time detection of catheters and other interventional devices in medical image sequences acquired using an X-ray system, for example. Further, the processes and applications may, in alternative embodiments, be located on one or more (e.g., distributed) processing devices on the network of FIG. 1. Any of the functions and steps provided in FIGS. 1-10 may be implemented in hardware, software or a combination of both.

What is claimed is:

1. A system for processing pixel representative image data of medical images of patient anatomy to automatically identify an interventional instrument, comprising:
    an acquisition processor configured to receive a plurality of sequential medical images of a patient anatomical portion; and
    an image data processor configured to perform the following:
    detecting and subtracting background image data from pixel luminance data comprising said plurality of sequential medical images to provide processed pixel luminance data comprising a plurality of processed sequential medical images,
    computing gradient components of individual pixels of said processed pixel luminance data,
    modifying the computed gradient component data by suppressing computed gradient components lacking symmetry about an interventional instrument width dimension,
    filtering the modified computed gradient component data for use in providing image representative data showing said interventional instrument, and
    comparing the filtered modified computed gradient component data with a threshold and uses filtered modified computed gradient component data exceeding a threshold in providing image representative data showing said interventional instrument.

2. A system according to claim 1, wherein
said image data processor compares gradient components of individual pixels with a threshold and modifies the computed gradient component data by suppressing computed gradient components having a magnitude below the threshold.

3. A system according to claim 1, wherein
said image data processor filters the modified computed gradient component data using a Sobel type of filter.

4. A system according to claim 1, wherein
said image data processor detects and subtracts background image data from said pixel luminance data using a filter including a first filter function having a first response time for filtering received luminance representative values of a particular individual pixel varying in response to a first motion disturbance in said plurality of sequential medical images for use in identifying a substantially minimum luminance value of said particular individual pixel in said plurality of sequential medical images; and
said image data processor applies said filter in filtering luminance representative values of individual pixels of said plurality of sequential medical images to identify substantially minimum luminance values of individual pixels in said plurality of sequential medical images as background image data of said plurality of sequential medical images.

5. A system according to claim 4, wherein
said first motion disturbance is at least one of, (a) a heart rate related disturbance and (b) a respiratory rate related disturbance.

6. A system according to claim 4, including
an adaptively variable filter adjustable to alter said first response time in response to variation in frequency of said first motion disturbance.

7. A system according to claim 1, wherein
said acquisition processor receives pixel luminance data comprising said plurality of sequential medical images of said patient anatomical portion and luminance data of an individual image comprises a plurality of pixel luminance representative values of a plurality of individual pixels of said individual image.

8. A system for processing pixel representative image data of medical images of patient anatomy to automatically identify an interventional device, comprising:
    an acquisition configured to receive pixel luminance data comprising a plurality of sequential medical images of a patient anatomical portion and luminance data of an individual image comprises a plurality of pixel luminance representative values of a plurality of individual pixels of said individual image; and
    an image data processor configured to perform the following:
    detecting and subtracting background image data from said pixel luminance data comprising said plurality of sequential medical images to provide processed pixel luminance data comprising a plurality of processed sequential medical images,
    computing gradient components of individual pixels of said processed pixel luminance data,
    modifying the computed gradient component data by suppressing computed gradient components lacking substantial symmetry about an interventional device width dimension,
    filtering the modified computed gradient component data,
    comparing the filtered modified computed gradient component data with a threshold and
    identifying image data representing an interventional device as data exceeding a threshold.

9. A system according to claim 8, wherein
the data exceeds said threshold if the data is at least one of, (a) greater than said threshold and (b) below said threshold.

10. A system according to claim 8, wherein
said image data processor adaptively adjusts said threshold in response to image pattern analysis substantially optimizing interventional device detection.

11. A system according to claim 8, wherein
said image data processor compares gradient components of individual pixels with a threshold and modifies the computed gradient component data by suppressing computed gradient components having a magnitude below the threshold.

12. A method for processing pixel representative image data of medical images of patient anatomy to automatically identify an interventional device, comprising:
    a computer processor executing the following steps of:
    storing pixel luminance data comprising a plurality of sequential medical images of a patient anatomical portion and luminance data of an individual image comprises a plurality of pixel luminance representative values of a plurality of individual pixels of said individual image;

detecting and subtracting background image data from said pixel luminance data comprising said plurality of sequential medical images to provide processed pixel luminance data comprising a plurality of processed sequential medical images, computing gradient components of individual pixels of said processed pixel luminance data, modifying the computed gradient component data by suppressing computed gradient components lacking substantial symmetry about an interventional device width dimension, filtering the modified computed gradient component data;

comparing the filtered modified computed gradient component data with a threshold; and identifying image data representing an interventional device as data exceeding a threshold.

13. A method according to claim 12, including the activities of comparing gradient components of individual pixels with a threshold and modifying the computed gradient component data by suppressing computed gradient components having a magnitude below the threshold.

* * * * *